United States Patent
Friedl et al.

(10) Patent No.: US 8,667,814 B2
(45) Date of Patent: Mar. 11, 2014

(54) METHOD AND APPARATUS FOR THE FORCE-FITTING CONNECTION OF GLASS-LIKE COMPONENTS TO METALS

(75) Inventors: Wolfgang Friedl, Kaisheim (DE); Egbert Wenninger, Rain (DE); Stephan Leitenmeier, Augsburg (DE); Franz Bachmeir, Baar (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 23 days.

(21) Appl. No.: 13/131,423

(22) PCT Filed: Nov. 26, 2009

(86) PCT No.: PCT/DE2009/001678
§ 371 (c)(1),
(2), (4) Date: Aug. 9, 2011

(87) PCT Pub. No.: WO2010/063262
PCT Pub. Date: Jun. 10, 2010

(65) Prior Publication Data
US 2012/0017641 A1    Jan. 26, 2012

(30) Foreign Application Priority Data
Dec. 3, 2008 (DE) .......................... 10 2008 060 301

(51) Int. Cl.
*C03B 11/14* (2006.01)
*C03C 27/02* (2006.01)
*B23K 20/10* (2006.01)
(52) U.S. Cl.
CPC .................. *C03B 11/14* (2013.01); *C03C 27/02* (2013.01); *B23K 20/106* (2013.01)
USPC ............. 65/154; 65/33.5; 65/59.1; 228/110.1

(58) Field of Classification Search
CPC ....... C03B 11/14; C03C 27/02; B23K 20/106
USPC ............... 65/33.5, 59.1–59.7, 154; 228/110.1
See application file for complete search history.

(56) References Cited

U.S. PATENT DOCUMENTS 3,628,716 A * 12/1971 Fastre ............................ 228/1.1
3,908,886 A    9/1975 Raske
(Continued)

FOREIGN PATENT DOCUMENTS

CN    101110458 A    1/2008
DE    2 312 724    11/1973
(Continued)

OTHER PUBLICATIONS

German Office Action Dated Oct. 6, 2011 and English Translation.
(Continued)

*Primary Examiner* — Matthew J. Daniels
*Assistant Examiner* — Cynthia Szewczyk
(74) *Attorney, Agent, or Firm* — Brinks Gilson & Lione (57) ABSTRACT

The invention relates to a method and to a device for force-fit connecting glass-like components to metals, particularly for connecting a glass plate (2) to a large-scale mounting element (19) as a central connecting element, particularly made of metal, having the following characteristics: a) an input and control device (6) for inputting process data, b) a storage and positioning device (15) for supplying individual fastener elements (1) as support elements of a central connection element (20), c) having mounting and fixing means (3) for fixing a glass plate (2), d) a thickness measuring device (7) for measuring the thickness of each of the components to be connected and layers of the same, e) a measuring machine (8) for measuring the resonant frequency of the glass plate (2) and a surface sensor (10) for determining the roughness of the glass plate (2), f) a sliding device (11) for pressing together the components to be connected by means of an ultrasonic horn (4), g) a device for generating ultrasonics by means of an ultrasonic horn (4), and a computer program for performing the method.

9 Claims, 5 Drawing Sheets

(56) References Cited

U.S. PATENT DOCUMENTS

| | | |
|---|---|---|
| 5,435,863 A | 7/1995 | Frantz |
| 5,658,408 A | 8/1997 | Frantz et al. |
| 5,855,706 A | 1/1999 | Grewell |
| 6,108,144 A | 8/2000 | Holderer et al. |
| 6,979,376 B2 | 12/2005 | Nuss |
| 7,491,280 B2 | 2/2009 | Gordon, Jr. |
| 8,021,504 B2 * | 9/2011 | Gabler et al. ............... 156/64 |
| 2009/0314412 A1 | 12/2009 | Gäbler et al. |

FOREIGN PATENT DOCUMENTS

| | | |
|---|---|---|
| DE | 43 21 874 A1 | 1/1995 |
| DE | 44 29 684 A1 | 2/1996 |
| DE | 195 46 997 A1 | 8/1997 |
| DE | 195 46 997 C2 | 12/1997 |
| DE | 198 33 590 C1 | 3/2000 |
| DE | 101 10 048 A1 | 9/2002 |
| EP | 0 567 426 B1 | 3/1993 |
| JP | 60-191680 | 9/1985 |
| JP | 2-36284 | 2/1990 |
| JP | 2000-98205 | 7/1999 |
| JP | 2006-524577 | 11/2006 |
| JP | 2010-503536 | 2/2010 |
| WO | WO/98/49009 | 11/1998 |
| WO | WO 02/098636 A1 | 12/2002 |
| WO | WO 2004/096480 A1 | 11/2004 |
| WO | WO 2008/031823 A1 | 3/2008 |

OTHER PUBLICATIONS

Japanese Office Action dated Dec. 25, 2012 and English Translation.
Chinese Office Action, Application No. 200980147881.1, Dated Feb. 4, 2013.
International Search Report for International Application No. PCT/DE2009/001678, dated Apr. 29, 2010.
Erwin Roeder, et al., Fügen von Glas, Glaskeramik and Keramik mit Metall durch Ultraschall, Neue Werkstoffverbunde durch Ultraschall-schweiβen, Dated 1995, 8 pages, and English Translation.

* cited by examiner

METHOD AND APPARATUS FOR THE FORCE-FITTING CONNECTION OF GLASS-LIKE COMPONENTS TO METALS

CROSS REFERENCE TO RELATED APPLICATIONS

This application is a national stage application under 35 U.S.C. 371 of international application number PCT/DE2009/001678 filed Nov. 26, 2009 (WO 2010/063262 A1) and also claims priority to German application number 10 2008 060 301.5 filed Dec. 3, 2008, all of which are hereby incorporated by reference in their entirety.

SUMMARY

The invention relates to a method and an apparatus for the force-fitting connection of glass-like components, for example ceramic surfaces, to metals, in particular glass sheets to aluminum.

The following documents are cited in relation to the prior art.

German patent specification 23 12 724 discloses a method for the ultrasonic welding of a component consisting of metal to a component formed from a nonmetal, with the insertion of a metallic interlayer.

As an example of this prior art, this document proceeds from a ceramic-precious metal-aluminum-steel connection, which is welded in a known manner by placing a sonotrode of an ultrasonic welding appliance on the steel part. Depending on the type of material and the dimensions of the nonmetallic component, it may be the case here that said component is not sufficiently resistant to the loading which occurs during ultrasonic welding, and this can be reflected in cracking and fracture. The nonmetallic component mentioned in this document is a small piezoceramic plate or else a small quartz or glass plate. Therefore, the method described in said document is based on the object of avoiding the disadvantages described above in such a method.

This object is achieved in that firstly a layer of aluminum or an aluminum film is applied to the mutual connection surfaces of the metal part and of the nonmetal part, then the nonmetallic component is fixed and the connection surfaces coated with aluminum are placed onto one another and preheated to a temperature of at least 250° C., preferably 350° C. Finally, these preheated parts are then connected to one another by ultrasonic welding.

Patent specification 23 12 724 provides no indication of the process for a force-fitting connection of a glass surface to a large-scale connection element.

DE 195 46 997 C2 discloses a further method for the connection of metallic parts to nonmetallic parts.

This document mentions the joining of glass or glass-ceramic and pure aluminum by ultrasound as the methods known previously. Here, the energy required for welding is introduced into the weld material as shear waves in the form of mechanical oscillations of a resonator, the sonotrode, under the action of a small static contact pressure. Furthermore, in relation to the prior art, a joining method known from DE 44 06 220 A1 for the connection of metals and ceramics by high-frequency fields is mentioned.

The invention described therein is based on the problem, proceeding from the cited prior art, of providing a simple method for the connection of metallic parts to nonmetallic parts, which, in particular, also makes it possible to obtain high-quality connections between parts of aluminum and parts of glass or ceramic.

As a solution to this problem, DE 195 46 997 C2 claims a method for the connection of metallic parts to nonmetallic parts, in particular of parts of aluminum or copper to parts of glass or ceramic, in which the connection is established by vibration welding with a vibration movement by constantly rotating oscillations. Here, the constantly rotating oscillations are effected in the form of continuous oscillation paths which are identical for all points within the welding surface, likewise with a contact pressure acting perpendicularly to the welding surface and also subsequent mounting without rotating oscillations.

Furthermore, DE 198 33 590 C1 discloses a method for welding an extended optical component to a metal fastening, the use thereof and also the optical assembly.

This method is based on the object of also making the ultrasonic welding of optical components to metal fastenings available for extended optical components, in particular if the latter can only be exposed to the smallest stresses on account of their high sensitivity and/or high optical quality.

In order to achieve this object, said document claims a method for welding an extended optical component to a metal fastening, wherein the transparent optical component is generally mounted with a vibration-damping action at least at its edge opposite and adjacent to a fastening location provided, and wherein the metal fastening is placed onto the fastening location provided at the edge of the extended optical region. Furthermore, the sonotrode is placed onto the fastening with the exertion at best of small bending moments, and the ultrasonic welding is carried out.

Suggestions to provide a large-scale mounting element able to withstand loading cannot be gathered from these last documents either.

Finally, WO 2008/031823 A1 discloses a quality monitoring method for ultrasonic welding.

In relation to the prior art, this document cites WO 2004/096480 A1, in which the control of time-dependent welding parameters for the welding of wire strands is adapted to desired values.

Furthermore, said document makes reference to DE 44 29 684 A1, in which characteristic parameters are adapted to a constant-width tolerance range during the welding of electrical conductors.

In DE 101 10 048 A1, which is also cited in said document, a method for testing connections established by ultrasonic wire bonding makes it possible to draw conclusions relating to the strength of the connection by means of the monitoring of master values.

Furthermore, the prior art deals with the ultrasonic welding of plastics parts (DE 43 21 874 A1, EP 0 567 426 B, WO 02/098636 A1). In relation to this topic, reference is also made marginally to WO 98/49009, U.S. Pat. No. 5,855,706 A, U.S. Pat. No. 5,658,408 A and U.S. Pat. No. 5,435,863 A.

Proceeding from this prior art, the method according to WO 2008/031823 A1 is based on the object of developing such a method in such a way that more sensitive monitoring of process operations is made possible compared to the prior art, so that it is possible to perform appropriate parameter changes which lead to higher-quality welding results or make adaptation to process conditions possible, which ensures that quality welds can be achieved to the scope required. Here, the intention is for simple use to be possible for series production.

In order to achieve this object, WO 2008/031823 A1 claims a quality assurance method for ultrasonic welding, in which a measured value tolerance range is determined from measured values which result from executed welding processes and can be associated with at least one parameter which influences the welding process and/or represents the quality of the welding process, wherein measured values associated with an identical parameter in subsequent further welding processes are taken into account during the quality monitoring.

In such a method, the protection sought according to the characterizing part of claim 1 is that, depending on deviations between the further measured values and the tolerance range determined from the preceding measured values, the measured value tolerance range is changed in its form or in relation to its orientation to an average value for the further welding processes.

In general terms, the method claimed therein describes the processing of measured values from the field of ultrasonic welding which are familiar to a person skilled in the art. No indications of the configuration of an apparatus for the force-fitting connection of glass and aluminum can be gathered from said document.

Therefore, the apparatus make the process for the force-fitting connection of glass and metals reliable and also of making it easily executable for untrained people.

Further objects, features and advantages of this invention will become readily apparent to persons skilled in the art after a review of the following description, with reference to the drawings and claims that are appended to and form a part of this specification.

The apparatus according to the invention is described in more detail below.

In detail:

DETAILED DESCRIPTION

Figure 1:
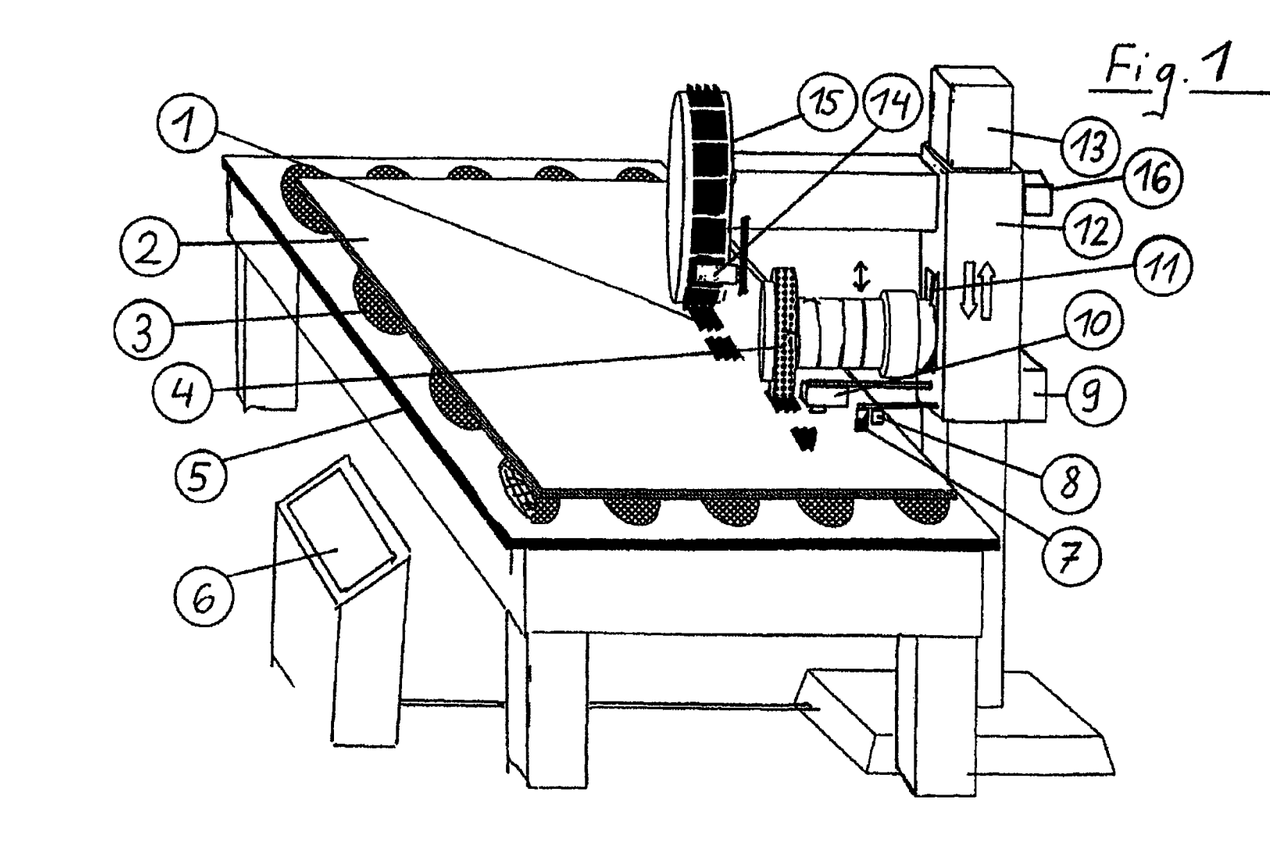
FIG. 1: shows a first form of the apparatus according to the invention

FIG. 1 shows an apparatus which makes it possible to continuously connect metal fastening tabs to a glass sheet by means of ultrasonic welding. Such a connection method is of economic interest because it is quicker and cheaper than a corresponding adhesive process. In order to achieve a force-fitting connection between a glass surface and a metal fastening over a relatively long distance, it must be taken into account that materials of glass and materials of metal have different coefficients of expansion in terms of their behavior under the action of heat. This means that a continuous force-fitting connection between an extended metal surface and a glass surface leads to stresses in both materials and thus prompts the formation of cracks. In order to counter this, it is provided according to the invention to weld individual metal tabs to a glass sheet at individual, preferably equidistant, locations and to then connect these fastening tabs to the respective structure providing the actual hold. Here, this structure providing the actual hold can be made of metal and afford the usual means for metal connections or can also consist of another material.

In the case of the apparatus shown in FIG. 1, the fastening elements 1 to be fitted in each case are taken from an associated storage and positioning device 15, which here is in the form of a coiled, strip-like magazine which provides fastening elements 1 as required by means of a drive 16. The type of material used in each case can be determined by means of a sensor 14. In principle, this input can also be carried out manually, but the operation of the sensor 14 is noticeably more reliable if the storage and positioning device 15 is equipped with fastening elements 1 of different material. Since it is also possible to use fastening elements having a multi-layer design in the region in which they are connected to the glass sheet 2, it is important to correctly distinguish between the various types of fastening elements.

Figure 3:
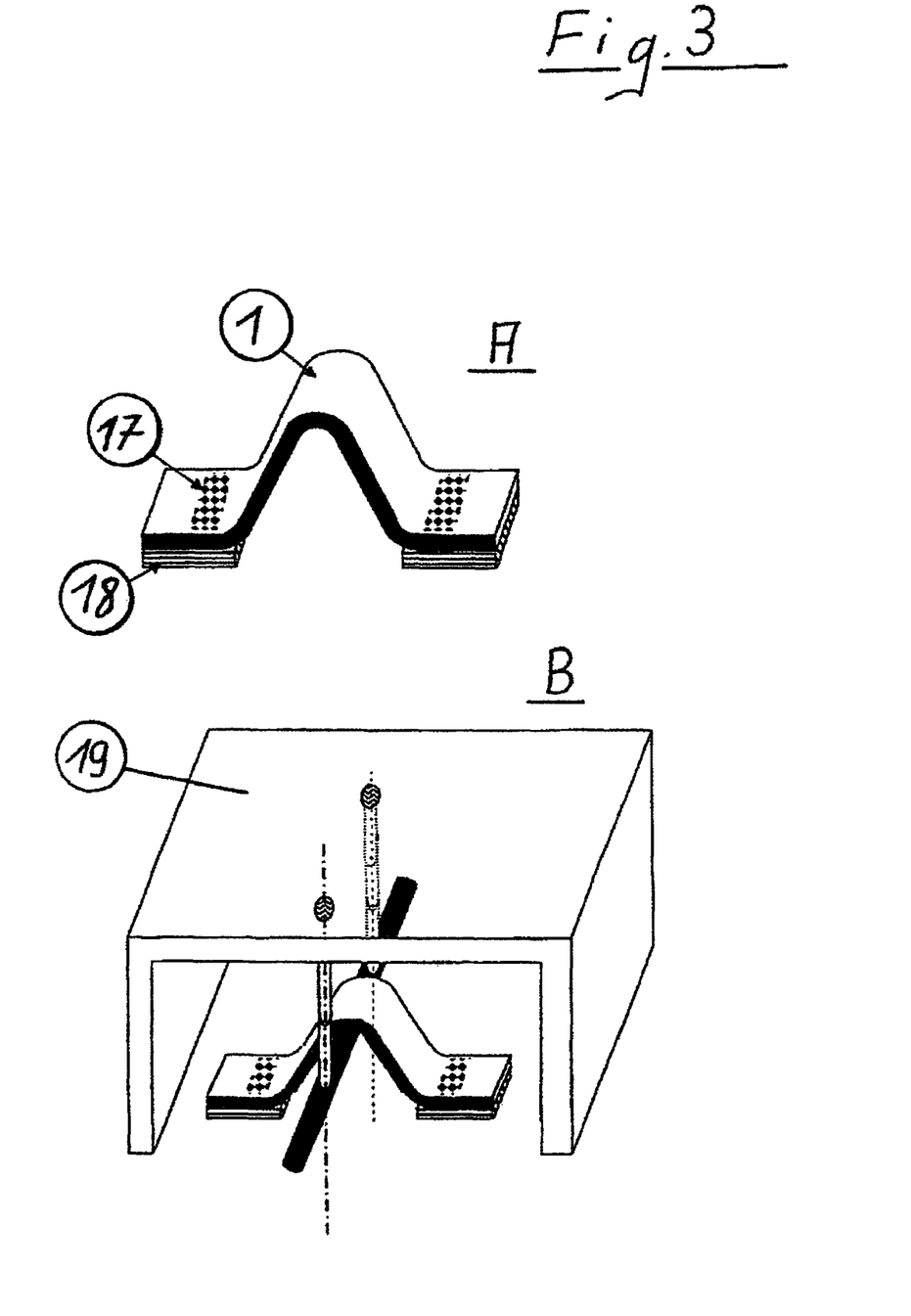
FIG. 3A: shows a fastening element.
FIG. 3B: shows a fastening element under stress.

This is because, in order to optimize the surface adhesion and the long-term stability of the welded connection and also in order to adapt the material properties of the fastening elements 1, e.g. the elasticity, it may be advantageous to use combinations of a plurality of metals, e.g. aluminum and steel, in the form of a plurality of metal sheets placed one onto another (cf. FIG. 3A). These layers can be applied by a sputtering process or can be plated in a rolling mill.

The configuration of the apparatuses required in this respect for removing a fastening element 1 from the magazine strip and for placing a fastening element 1 onto the glass sheet 2 is familiar to a person skilled in the art. Here, a displacement device 12 of the storage and positioning device 15 displaces the device 15 depending on the degree to which the magazine strip is filled and the contact angle of the fastening elements 1 which varies as a result.

The mounting and fixing means 3 fasten the glass sheet 2 to be equipped immovably on the plate-like abutment 5 for the sonotrode 4 and the respective fastening element 1. Depending on the loading to be expected, the mounting and fixing means 3 can be configured as suckers for fixing from below or else as holding-down devices of any type for fixing from above, or it is possible for both methods to be used at the same time.

Depending on the requirements of the welding process, the sonotrode 4 is moved via a displacement device 11 vertically in both directions by means of the displacement drive 9, or pressed onto the respective workpiece. Here, the sonotrode 4 follows the line predefined by the storage and positioning device 15 of the fastening elements 1. For reasons of better clarity, this process is shown in a distorted manner in the illustration in FIG. 1, since here the line of the deposited, or positioned, fastening elements 1 and the line of the fastening elements 1 sensed and welded on by the sonotrode 4, which are of course parts of a common line, are shown to be not aligned.

The displacement devices 11, 12 are accommodated in the main pillar 13. FIG. 1 shows the main pillar 13 fixed to the floor, but it can of course also be designed as part of an X-Y positioning if required.

It is likewise comprehensible for a person skilled in the art that the guide of the storage and positioning device 15 of the fastening elements 1 and the guide of the sonotrode 4, independently of the displacement device 11, can also be formed additionally, or instead, as part of a separate X-Y positioning system if required.

The input and control device 6 allows all the command inputs required to control the apparatus according to the invention to be provided at a central location. The input and output units required for the data traffic are determined by the configuration of the apparatus as a whole and the components thereof. They correspond to the current prior art and are therefore not described in more detail.

The thickness of the glass sheet 2 is measured by means of the device 7, and the associated resonant frequency of the glass sheet 2 is measured by means of the measuring appliance 8 via an appropriately controlled pressure sensor. Here, the resonant frequency of the glass sheet 2 can be determined before and/or after the activation of the mounting and fixing means 3.

It is furthermore advantageous to measure the natural oscillation of the glass sheet 2 during the welding process and to take the result of this measurement process into account as a feedback factor when determining the operational parameters of the sonotrode.

Here, the appropriate procedure depends both on the thickness and the size of the respective glass sheet or glass-like sheet 2 and also on the material, for example ceramic or glass. The thickness of the respective fastening element 1 and the thickness of the oxide layer thereof also play a role in the welding process. Both measured values, the thickness of the fastening element 1 and the thickness of the oxide layer thereof, can additionally be taken into account as parameters for controlling the welding process by the sonotrode 4. Similarly, the roughness depth of a glass sheet 2, which is determined by means of the sensor 10 installed in the region of a fastening element 1, can be taken into account for controlling the welding process. In this case, the operational parameters of the sonotrode which are to be controlled are the contact pressure of the sonotrode, the amplitude and the oscillation frequency of the sonotrode, possibly the feed rate thereof and the mode of operation, for example all types of pulsed mode.

Ideally, all these parameters are taken into account in conjunction with empirical values, determined in preliminary tests, for an optimum welding result. It is routine for a person skilled in the art to determine appropriate characteristics in preliminary tests for the combination of the widest variety of materials suitable for welding, and to make these characteristics available to the user as part of a basic programming. The possibility of a learning program which has a positive influence on the further welding processes is provided by virtue of the fact that it is additionally possible to query the input and control device 6 about the quality of the welding result obtained in each case.

In order to facilitate the connection in the case of ultrasonic welding, the preceding coating of the glass surface with a layer of metal or the effect on the roughness depth thereof by means of the influence of liquids or gases should be mentioned, for example. It is also possible to affect the fastening elements 1 in order to control the oxide layer, which is important for the connection, by means of liquids and gases.

Figure 2:
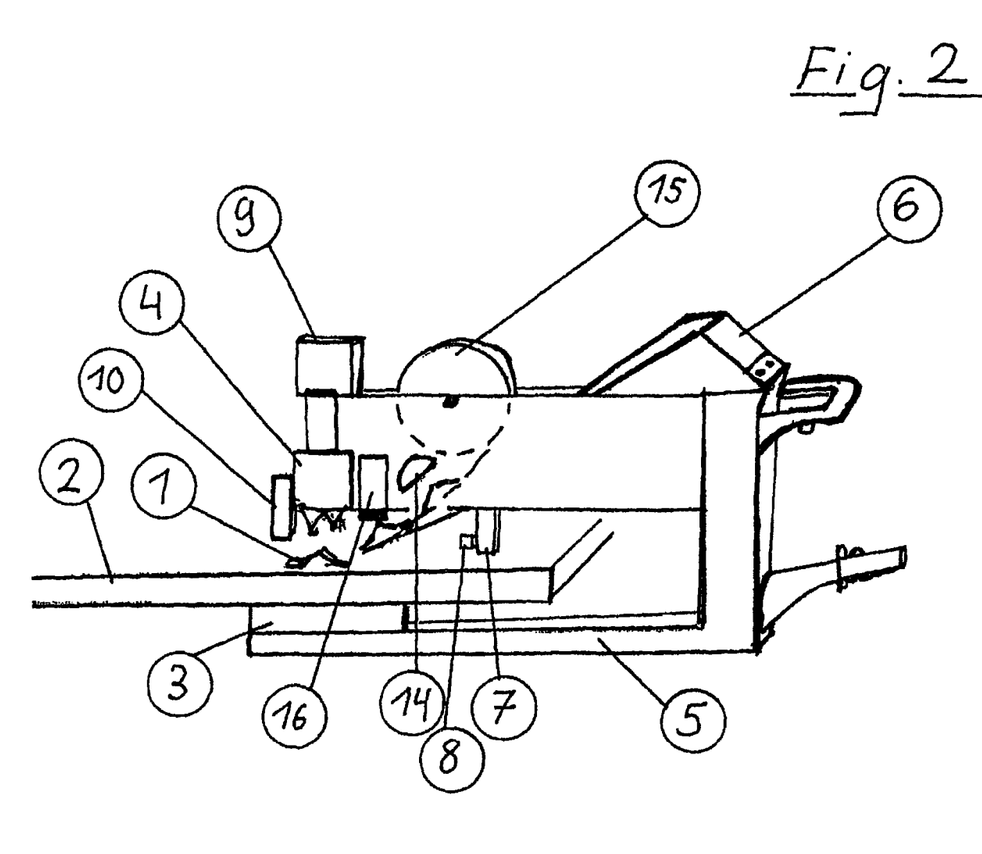
FIG. 2: shows a second form of the apparatus according to the invention.

FIG. 2 shows a second form of the apparatus according to the invention, which is suitable with preference for application in mobile use.

Here, the glass sheet 2 is supported on a relatively small surface by the mounting and fixing means 3. In the mobile sector, glass sheets 2 can be provided with appropriately adapted mounting elements, for example in the field of large photovoltaic installations and/or in the case of structural engineering. A relatively small bearing surface appears to be sufficient in these cases, since the glass sheet 2 can also be additionally placed on a workbench if required. In FIG. 2, the tongs-like welding appliance is held by the operator using the two handles shown on the right-hand side. The bottom part of this tongs-like construction bears the mounting and fixing means 3 and acts as an abutment 5. An angular fastening element 1 is shown here in section in FIG. 2. The sonotrode 4 can be seen together with its displacement drive 9 directly above the fastening element 1, where, in accordance with the angular form of the fastening element 1 shown, the sonotrode 4 has two energy transfer heads directed at the two side faces of the fastening element 1. In a manner which cannot be seen in this view, the surface sensor 10 is directed at the glass sheet 2. The storage and positioning device 15 of the fastening elements 1 is fitted, together with the sensor 14 for detecting the respective material of the fastening element 1 to be welded on, on the rear of the mobile welding apparatus shown. In this construction, the drive 16 of the apparatus 15 has to have a different spatial arrangement and is shown in somewhat stylized form for reasons of space. Here, the thickness measuring device 7 for the glass sheet 2 and the measuring appliance 8 for measuring the resonant frequency thereof are also arranged close to one another in the region of the bottom side of the top part of the tongs. The further measurement options described in relation to the apparatus shown in FIG. 1 can each be added in miniaturized form depending on the respective requirement.

The input and control unit 6 is shown in cross section as easily accessible in the region of the two handles.

FIG. 3A shows an angular fastening element 1 with two fastening points. Here, 17 denotes a respective welding location. By way of example, the connection material 18 here can consist of a combination of aluminum and steel (cf. in this respect also the description in relation to FIG. 1).

FIG. 3B shows a fastening element under stress. Here, the stress consists for example of a central connection element 20, which is pushed under the fastening element and is in the form of a flexurally rigid rod which pulls the central connection element upward by means of two screws screwed into it, the two screws being supported on the glass sheet 2 via the u-shaped support fitting 19 and thereby connecting the support fitting 19 to the glass sheet 2 with a force fit.

Figure 4:
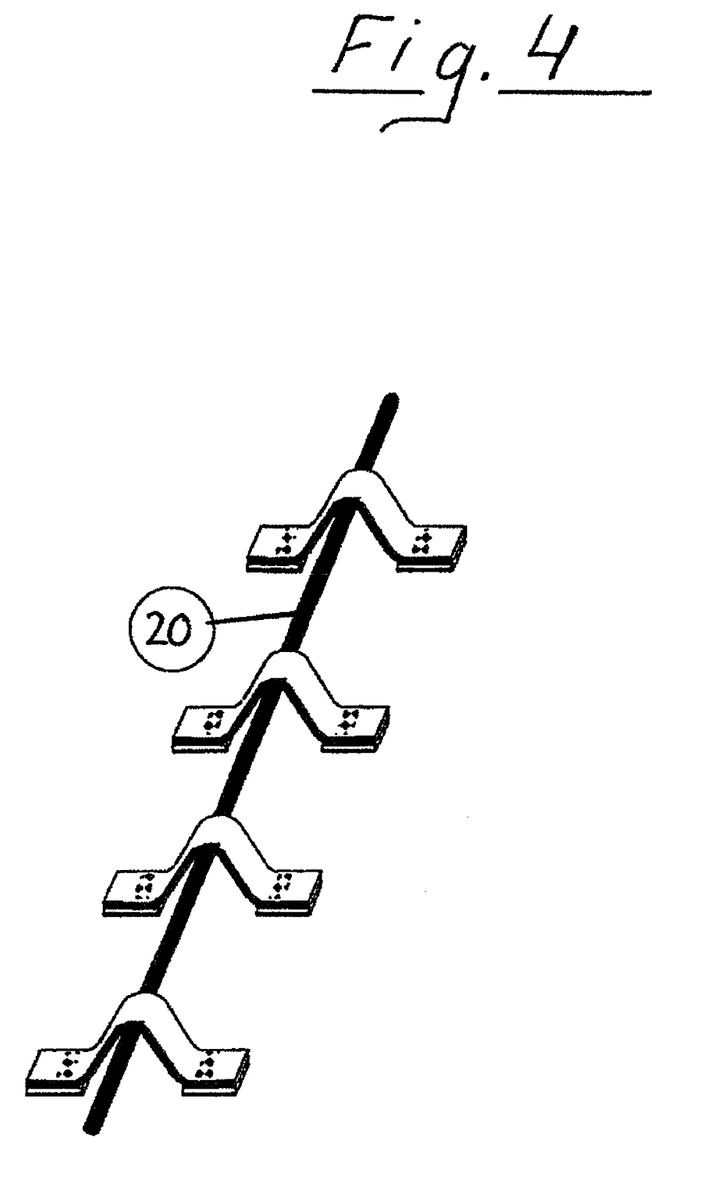
FIG. 4: shows a series of fastening elements.

FIG. 4 shows a series of fastening elements 1, in the case of which a central connection element 20 can serve as the basis for a force-fitting connection of a relatively long support fitting 19, as shown in detail in FIG. 3A.

Figure 5:
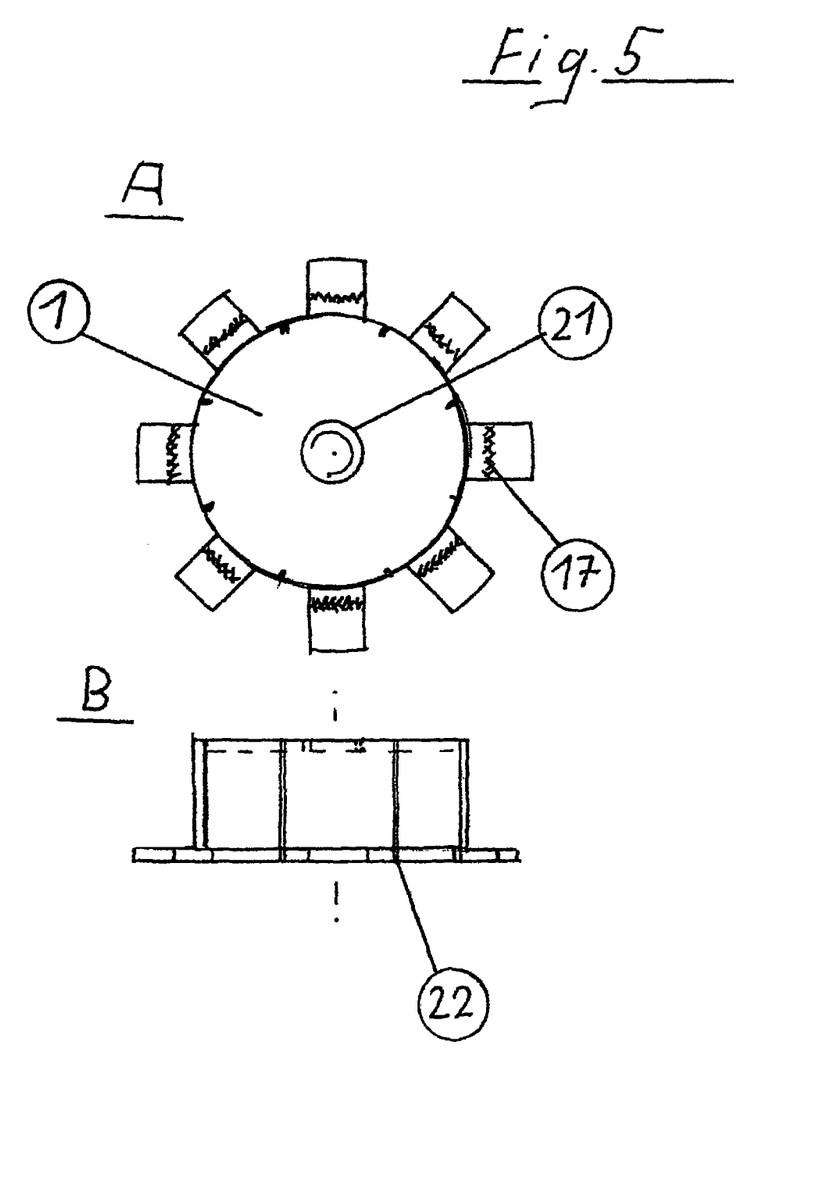
FIG. 5A: shows a particular fastening point from above.
FIG. 5B: shows a particular fastening point from the side.

FIG. 5A shows a particular fastening point from above. This makes it possible to provide a central fastening location 21 of a particular tensile strength and transverse stability. As can be seen in section in FIG. 5B, this involves a circular fastening element 1 which can be welded to a glass sheet by means of eight welding tabs distributed over the circumference thereof. The expansion gap 22 compensates for stresses between the various fastening tabs.

The complex control of the measurement methods and movement profiles described for welding methods requires a special control program.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

LIST OF REFERENCE NUMERALS (1) Fastening elements
(2) Glass sheet
(3) Mounting and fixing means
(4) Sonotrode
(5) Abutment (workbench)
(6) Input and control device
(7) Thickness measuring device (e.g. glass)
(8) Measuring appliance of the resonant frequency
(9) Displacement drive of the sonotrode 4
(10) Surface sensor (e.g. roughness depth of glass)
(11) Displacement device of the sonotrode 4
(12) Displacement device of the storage and positioning device 15
(13) Main pillar (14) Sensor for detecting the material of the fastening elements
(15) Storage and positioning device of the fastening elements
(16) Drive of the storage and positioning device 15
(17) Ultrasonic welding location
(18) Connection material
(19) Support fitting (large-scale mounting element)
(20) Central connection element
(21) Special central fastening location
(22) Expansion gap

The invention claimed is:

1. An apparatus for the force-fitting connection of glass-like components to metals comprising:
    a) an input and control device operable to input process data,
    b) a storage and positioning device operable to supply individual fastening elements as support elements of a central connection element,
    c) a mounting and fixing device operable to fix the glass sheet,
    d) a thickness measuring device operable to measure the thickness of each of the components to be connected and of oxide layers,
    e) a measuring appliance operable to measure the resonant frequency of the glass sheet and a surface sensor for determining the roughness depth of the glass sheet,
    f) an apparatus comprising a sonotrode operable to generate ultrasound,
    g) a displacement device operable to press the components to be connected together between a sonotrode and an abutment.

2. The apparatus as claimed in claim 1, wherein the fastening elements are made of pure aluminum or, with respect to the surfaces to be connected, comprise layers of different connection materials.

3. The apparatus as claimed in claim 1, wherein the mounting and fixing device comprises suckers or of holding-down devices.

4. The apparatus as claimed in claim 1, wherein a sensor is used to detect a type of material of the fastening elements, and the connection operation is monitored by a camera.

5. The apparatus as claimed in claim 1, wherein a support fitting is fastened to a plurality of fastening elements by a central connection element.

6. The apparatus as claimed in claim 1, wherein a generator for generating electromagnetic waves is installed in the region of the sonotrode.

7. The apparatus as claimed in claim 1, wherein a plurality of sonotrodes are arranged in a circle or in the form of a rectangle, wherein one or more of these sonotrodes can be operated in pulsed mode.

8. The apparatus as claimed in claim 1, where said apparatus has a tongs-like configuration for the purpose of mobile operation and has at least one handle.

9. An apparatus for the force-fitting connection of glass-like components to metals comprising:
    a) a computer operable to inputting process data,
    b) a magazine operable to supplying individual fastening elements as support elements of a central connection element,
    c) suckers or holding down devices operable to fixing the glass sheet,
    d) a thickness measuring device operable to measuring the thickness of each of the components to be connected and of oxide layers,
    e) a measuring appliance operable to measuring the resonant frequency of the glass sheet and a surface sensor for determining the roughness depth of the glass sheet,
    f) an apparatus comprising a sonotrode operable to generate ultrasound,
    g) a displacement device operable to press the components to be connected together between a sonotrode and an abutment.

* * * * *

UNITED STATES PATENT AND TRADEMARK OFFICE
CERTIFICATE OF CORRECTION

PATENT NO.       : 8,667,814 B2
APPLICATION NO. : 13/131423
DATED            : March 11, 2014
INVENTOR(S)      : Friedl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 90 days.

Signed and Sealed this

Twenty-ninth Day of September, 2015

Michelle K. Lee
*Director of the United States Patent and Trademark Office*